(12) United States Patent
Engle et al.

(10) Patent No.: US 8,002,315 B2
(45) Date of Patent: Aug. 23, 2011

(54) DEVICE FOR MEASURING FLUID PROPERTIES IN CAUSTIC ENVIRONMENTS

(75) Inventors: Brian Allen Engle, Armada, MI (US); Woojin Kim, Irvine, CA (US); George Szabo, Ortonville, MI (US)

(73) Assignee: General Electric Corporation, Schenectady, NY (US)

( * ) Notice: Subject to any disclaimer, the term of this patent is extended or adjusted under 35 U.S.C. 154(b) by 54 days.

(21) Appl. No.: 12/645,972

(22) Filed: Dec. 23, 2009

(65) Prior Publication Data

US 2011/0148096 A1  Jun. 23, 2011

(51) Int. Cl.
*F16L 37/00* (2006.01)

(52) U.S. Cl. ........................................ 285/305; 137/557

(58) Field of Classification Search .................... 285/93, 285/305; 137/557, 558; 439/180, 178, 179, 439/208, 210
See application file for complete search history.

(56) References Cited

U.S. PATENT DOCUMENTS

| | | | | |
|---|---|---|---|---|
| 4,205,702 A | * | 6/1980 | Silverwater | 137/557 |
| 4,921,008 A | * | 5/1990 | Foster | 137/557 |
| 5,798,557 A | | 8/1998 | Salatino et al. | |
| 5,863,025 A | * | 1/1999 | Noya | 251/129.17 |
| 5,915,168 A | | 6/1999 | Salatino et al. | |
| 6,252,229 B1 | | 6/2001 | Hays et al. | |
| 6,422,206 B1 | * | 7/2002 | Wade et al. | 123/514 |
| 6,518,084 B1 | | 2/2003 | Seitz et al. | |
| 6,596,117 B2 | | 7/2003 | Hays et al. | |
| 6,673,697 B2 | | 1/2004 | Ma et al. | |
| 6,742,537 B2 | * | 6/2004 | Martus et al. | 137/557 |
| 6,843,271 B2 | * | 1/2005 | Weldon et al. | 137/557 |
| 6,966,228 B2 | | 11/2005 | Binet et al. | |
| 7,224,056 B2 | | 5/2007 | Burtzlaff et al. | |
| 7,247,246 B2 | | 7/2007 | Nasiri et al. | |
| 7,273,763 B1 | | 9/2007 | Neumeier et al. | |
| 7,275,424 B2 | | 10/2007 | Felton et al. | |
| 7,383,851 B2 | * | 6/2008 | Jacobsen et al. | 137/557 |
| 7,416,984 B2 | | 8/2008 | Martin et al. | |
| 7,503,784 B2 | * | 3/2009 | Osborne et al. | 285/305 |

(Continued)

FOREIGN PATENT DOCUMENTS

WO   WO-02091439 A1   11/2002

(Continued)

OTHER PUBLICATIONS

European Search Report, Applicant, General Electric Company et al., Application No. 10195750.4, Mailed Mar. 24, 2011, 3 pages.

*Primary Examiner* — David E Bochna
(74) *Attorney, Agent, or Firm* — Global Patent Operation; Mark A. Conklin (57) ABSTRACT

There is provided embodiments of a fluid fitting, and system incorporating the fluid fitting therein, which is compatible with harsh, caustic environments such as those environments found in the automotive industry. In one embodiment, the fluid fitting can comprise a conductive element with a fluid pathway for transporting a fluid, e.g., fuel. The fluid fitting can also comprise a non-conductive element that is coupled to the conductive element in a manner discharging electrons from the conductive body. The non-conductive element can comprise a cavity with an opening exposing a sensing device with a sensing element disposed on a sensing element housing. The sensing element housing can be sealed to the conductive element, but expose the sensing element to the fluid in the fluid pathway.

20 Claims, 5 Drawing Sheets

U.S. PATENT DOCUMENTS

| | | |
|---|---|---|
| 2003/0037618 A1 | 2/2003 | Okawa |
| 2005/0269688 A1 | 12/2005 | Shiv |
| 2006/0255901 A1 | 11/2006 | Schwarz |
| 2008/0225505 A1 | 9/2008 | Martin et al. |
| 2009/0126694 A1 | 5/2009 | Ritz et al. |
| 2009/0168839 A1 | 7/2009 | Park |

FOREIGN PATENT DOCUMENTS

| | | |
|---|---|---|
| WO | WO-03021218 A2 | 3/2003 |
| WO | WO-2007117198 A1 | 10/2007 |

\* cited by examiner

FIG. 3
Section A-A

DEVICE FOR MEASURING FLUID PROPERTIES IN CAUSTIC ENVIRONMENTS

BACKGROUND OF THE INVENTION

The subject matter disclosed herein relates generally to fluid fittings, and more particularly, to embodiments of a fluid fitting that are configured to measure properties of fluids in harsh, caustic environments such as the environment in a fuel system.

There are many devices that can measure the properties of fluids. These devices include the fittings and couplings (hereinafter "fittings") that are used to secure, and in some cases restrain, the hoses, pipes, and lines which carry the fluid between two points. These fittings may incorporate devices such as sensors that are particularly responsive to one or more of the properties of the fluid. Temperature sensors, pressure sensors, and the like are all suitable devices that can be incorporated as part of the fitting. Certain applications, however, require that the fittings have special construction, which can withstand the physical and chemical rigors imposed by the fluid environment. These environments can include, for example, fuel carrying and distribution systems that are typically found in automobiles.

While fittings have been developed that can monitor the fuel and other fluids in these systems, few of these fittings can incorporate semiconductor die and similar devices such as ceramic and similar capacitive devices. In one example, techniques that use epoxy to secure such devices to a metal or plastic component are inadequate because the epoxy can fail due to the thermal cycling and/or pressure cycling inherent in the automotive environments. The epoxy, as well as the other materials of construction, can also breakdown due to exposure to the caustic chemical properties of the fluid in the fuel system. Furthermore, it has also been found that residual stresses can be induced in the devices themselves by the epoxy during the curing/adhesion processes. These stresses can require additional mitigating steps to compensate for deviations in the measurements by the device.

In another example, some fittings that are used to measure fluid pressure in a pipe can incorporate such ceramic capacitive circuits as circuits that are printed on stainless steel foil. This approach requires that the fitting comprise a large stainless steel housing, as well as a threaded connector and brazed joint for securing the housing to the pipe. This construction makes the overall package bulky, a problem for the automotive environments because the larger components in the fuel system significantly increase the risk of damage in a crash scenario. Moreover, due to the space constraints in the automobile engine compartment, the use of such large monitoring fittings may require changes to the components, design, and sheet metal of the vehicle.

Still other examples of fittings for measuring fluid properties are susceptible to electrostatic discharge ("ESD"). That is, such fittings are constructed of conductive materials that, while compatible with the particular fluid of the system, can permit charge to build up at least within and around the fluid pathway. These fittings often discharge the built-up charge with external hardware, e.g., grounding straps. This hardware, however, can generally hinder application and use of the fitting in the environments discussed above.

Therefore, it would be advantageous to provide a fitting that can measure properties of the fluid, but that is designed and manufactured for robust, and varied applications. It would also be advantageous, for example, to provide a fitting that can be operatively configured to be installed, removed, and re-installed easily, and quickly during manufacturing, production, and service of, e.g., automobiles and automobile fuel systems. Moreover, such fittings could provide other advantages are needed that can withstand caustic environments, dissipate electrical charge, and provide reliable, platform technology for monitoring a variety of properties of the fluids in these systems, while being constructed in a manner that meets the cost, size, and other constraints of the automotive industry.

BRIEF DESCRIPTION OF THE INVENTION

In one embodiment, a device for connecting a plurality of tubes comprises a non-conductive housing that can comprise a receptacle end for receiving a plug device. The device can also comprise a ground path for conducting charge to the receptacle end, and a conductive housing coupled to the ground path. The conductive housing can comprise a first fluid pathway for receiving a fluid, and a mating portion secured to the non-conductive housing, where the mating portion can have an aperture exposing the first fluid pathway to the non-conductive housing. The device can further comprise a sensing element housing that is disposed in the aperture, where the sensing element housing can comprise a first open end proximate the non-conductive housing, a second open end proximate the first fluid pathway, and a second fluid pathway that extends from the first open end and the second open end, the second fluid pathway for receiving the fluid from the first fluid pathway. The device can still further comprise a sensing element exposed to the fluid in the second fluid pathway, the sensing element for collecting data about a property of the fluid.

In another embodiment, a fluid fitting can comprise a body that can comprise a non-conductive housing, and a conductive housing that is coupled to the non-conductive housing, where the conductive housing can have a first fluid pathway for receiving a fluid. The fluid fitting can also comprise a conductive terminal that extends through the non-conductive housing, the conductive terminal can comprise a terminal body with an end in electrical contact with the conductive housing. The fluid fitting can further comprise a sensing device responsive to a property of the fluid, the sensing device can comprise a sensing element housing that extends into the conductive housing. The sensing element housing can comprise a first open end proximate the non-conductive housing, a second open end proximate the first fluid pathway, and a second fluid pathway extending between the first open end and the second open end, the second fluid pathway receiving the fluid from the first fluid pathway. The fluid fitting can still further comprise a seal in surrounding relation to the sensing element housing, the seal can comprise at least one surface in contact with the conductive housing.

In yet another embodiment, a fluid fitting for monitoring properties of a fluid. The fluid fitting can comprise a non-conductive housing for receiving a plug device, a conductive housing secured to the non-conductive housing, where the conductive housing can have a first fluid pathway for receiving the fluid, and a mating portion coupled to the non-conductive housing with a weldment, the mating portion can comprise an aperture exposing the first fluid pathway. The fluid fitting can also comprise a sensing element housing that extends through the aperture, in which the sensing element housing can comprise a first open end proximate the non-conductive housing, a second open end proximate the first fluid pathway, and a second fluid pathway extending between the first open end and the second open end, where the second fluid pathway receiving fluid from the first fluid pathway. The fluid fitting can further comprise a seal in surrounding relation to the sensing element housing, the seal having a surface in contact with the aperture, as well as a sensing element exposed to the second fluid pathway, the sensing element for sensing properties of the fluid in the first fluid pathway. The fluid fitting can be further described wherein the non-conductive housing comprises a conductive terminal extending through the non-conductive housing in a manner discharging electrons from the conductive housing to the plug device.

BRIEF DESCRIPTION OF THE DRAWINGS

So that the manner in which the features of the invention can be understood in detail, a detailed description of which can be had had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the principles of certain embodiments of invention.

Thus, for further understanding of the invention, references can be made to the following detailed description, read in connection with the drawings in which.

DETAILED DESCRIPTION OF THE INVENTION

This written description uses examples to disclose the invention, including the best mode, and also to enable any person skilled in the art to practice the invention, including making and using any devices or systems and performing any incorporated methods. The patentable scope of the invention is defied by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

There is provided below embodiments of a fluid fitting, and a system comprising the same, with features adapted for fluid-carrying tubing in pressurized environments, and in one embodiment the fitting can be compatible with harsh, caustic fluids. These embodiments can be configured to measure properties such as temperature, and pressure of the fluid, and also to discharge electrons that can build-up on portions of the fluid fitting, such as within the portion of the fluid fitting in which the fluid passes. These characteristics are beneficial because fluid fittings that incorporate such concepts can be constructed of materials, e.g., conductive and non-conductive polymers, which can reduce the size, weight, and cost of the fluid fitting. Likewise these materials can comprise other materials, components, and the like that are useful for protecting the fitting (and its associated electrical components) from ESD and ESD-related problems. Additional details of these and other features are discussed in connection with the embodiments of the fluid fitting that are illustrated in FIGS. 2-5 and described below. Before discussing those details, and to further develop some of the general concepts of embodiments of the invention, however, reference can be had to the high-level schematic diagram of FIG. 1, in which is depicted one exemplary implementation of a fluid fitting of the type contemplated herein.

Figure 1:
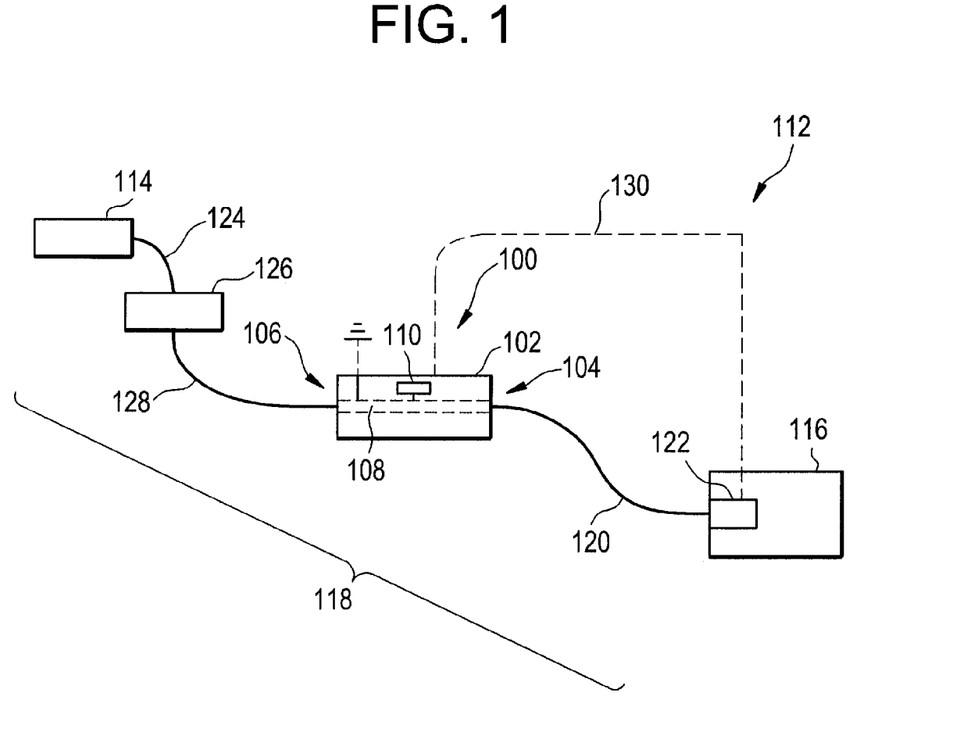
FIG. 1 is a schematic diagram of a fuel injection system that comprises a fluid fitting that is made in one embodiment of the invention.

So with reference now to FIG. 1, and by way of non-limiting example, it is seen that a fluid fitting 100 that is made in one embodiment of the invention can be implemented as part of a fuel injection system such as would be found in automotive vehicles. The fluid fitting 100 can comprise a body 102 with an input side 104, an output side 106, and a fluid pathway 108 that permits a fluid such as fuel to flow therebetween. The fluid fitting 100 can also comprise a sensing device 110 that communicates with the fluid pathway 108 so as to permit the fuel to interact with the sensing device 110. This interaction can permit data and information about the fuel to be collected, such as, but not limited to, temperature, pressure, flow rate, fuel chemistry, as well other properties consistent with fuel (and other fluids) of the type disclosed and contemplated herein.

The body 102 of the fluid fitting 100 can be constructed monolithically, such as would be found in a single, extruded plastic part, or as elements that are individually formed and assembled together. In one embodiment, the body 102 can comprise elements that are constructed of different materials, such as one element that can comprise conductive material, and one element that can comprise non-conductive material. These elements can be coupled together so as to provide a ground path (not shown) through the non-conductive material. This ground path can discharge electrons that build-up on the conductive material such as can be caused by the flow of the fluids in the fluid pathway 108. In one example, the ground path can comprise a conductive material that is incorporated into the non-conductive element. This material can be in the form of a metallic pin or terminal, which can have an end in contact with the conductive element and an end coupled to ground. The ground can be included in a plug device such as an electrical connector coupled to the body 102. This configuration can be particularly beneficial because the use of ground path prevents the communicating terminals of the electrical connector from being shorted by conductive resins that may be used to provide an electrostatic ground path for applications that include electrically conductive fluids. A detailed example of one configuration of such a terminal is provided in connection with FIG. 3 below.

The body 102 and/or each of the elements can be formed of conductive and non-conductive materials, such as conductive and non-conductive polymers, metals (e.g., stainless steel), as well as composites and any combinations thereof. The elements can be coated with materials that can be selected because of their compatibility with the fluid, and the fluid medium, such as is the case with materials that have physical and/or chemical properties that resist corrosion in caustic environments. Manufacturing processes implemented to make the elements of the fluid fitting 100 include casting, molding, extruding, machining (e.g., turning, and milling) and other techniques that are suitable for forming the various elements and components of the fluid fitting 100, some of which are disclosed and described herein. Because these processes, and the materials that are utilized by such processes, are generally well-known to those having ordinary skill in the automotive arts, no additional details will be provided herein, unless such details are necessary to explain the embodiments and concepts of the fluid fittings contemplated herein.

When the construction of the body 102 comprises multiple elements, it is further contemplated that the body 102 can comprise connective features that are used to couple the various elements together. These can include mechanical fasteners such as screws, adhesives, welds, and the like. These connective features can be selected so that they are likewise compatible with the particular application, such as by selecting materials for adhesives and weldments that are compatible with high temperatures (e.g., in excess of about 150 C), and high pressures (e.g., in excess of about 1000 psi), which may be found in the fuel injection system 112 of FIG. 1.

Each of the input side 104 and the output side 106 can be configured to couple tubing such as fuel lines with the body 102. This coupling can include the use of mechanical interfaces such as threaded fasteners, hose clamps, barbed and similarly shaped devices, as well as quick-connect devices such as those described below. Each of these interfaces can engage a portion of the fuel line so as to secure the fuel line to the fitting, and permit fuel to travel from the fuel line and into the fluid pathway 108 of the fluid fitting 100. The interfaces are likewise operatively configured to retain pressure within the various lines, as well as to maintain the overall properties of the fuel such as pressure that is required by, e.g, the fuel injection system.

Sensors of the type used as the sensing device 110 can be configured to sense a variety of properties such as those discussed above, and including, but not limited to, temperature, pressure, fluid flow properties (e.g., flow rate), fluid chemical properties (e.g., viscosity, conductivity, levels of contaminants, and chemical composition), among many others. These sensors can collect data, which can then be processed, transferred from the fluid fitting 100, or otherwise manipulated for purposes of, e.g., optimizing the fuel injection system 112. The sensors can include probes comprising thermistors, thermocouples and other devices responsive to changes in the temperature of the fluid. The sensors can also include probes sensitive to the pressure of the fluid. Any of these probes can be constructed of discrete electrical elements, combinations of elements such as the combinations found in electrical circuits, as well as wholly or partially incorporated as discrete, semiconductor, and/or solid-state technology.

It is also contemplated that embodiments of the fluid fitting 100 can comprise one or more groups of electrical circuits that are each configured to operate, separately or in conjunction with other electrical circuits, to monitor the properties of the fluid, such as the properties described herein. The electrical circuits that are used to implement the embodiments of the invention can be constructed in a manner that interconnect a variety of electrical elements that comprise, but not limited to, resistors, capacitors, transistors, transmission lines, and switches. They may further communicate with other circuits (and/or devices), which execute high-level logic functions, algorithms, as well as process firmware, and software instructions. Exemplary circuits of this type include, but are not limited to, field programmable gate arrays ("FPGAs"), and application specific integrated circuits ("ASICs"). While all of these elements, circuits, and devices function individually in a manner that is generally understood by those artisans that have ordinary skill in the electrical arts, it is their combination and integration into functional groups and circuits that generally provide for some embodiments of the invention that are disclosed and described herein.

With continued reference to FIG. 1, and now discussing one implementation of the fluid fitting 100, the fluid fitting 100 can be implemented as part of a fuel injection system 112. The fuel injection system 112 can comprise a combustion engine 114, a fuel tank 116, and a fluid path 118 that couples the combustion engine 114 and the fuel tank 116 via the fluid fitting 100. The fluid path 118 can comprise a low pressure input line 120 and a low pressure pump 122, which pumps fuel from the fuel tank 116 through the low pressure input line 120 and into the input side 104 of the fluid fitting 100. The fluid path 118 can also comprise a high pressure line 124, a high pressure pump 126, and a low pressure output line 128, which couples the high pressure pump 126 with the output side 106 of the fluid fitting 100.

In one embodiment of the fluid fitting 100, the sensing device 110 can be configured as part of a feedback loop 130, which can be formed so that the data and information collected by the fluid fitting 100 is utilized to modify parameters of other parts of the fuel injection system 112, e.g., the low pressure pump 122. The feedback loop 130 can comprise electrical circuits, wires, and other devices that can be used to transmit signals from the fluid fitting 100. These signals can include the data and information collected, as well as other signals that can change the operation of the fuel injection system 112, e.g., by raising and lowering the pressure of the fluid that is received by the high pressure pump 126. In one example, the feedback loop 130 can comprise devices that can process the data such as by comparing the measured properties with a pre-determined threshold value, e.g., a minimum pressure, a maximum pressure, a minimum temperature, and a maximum temperature. In another example, the fluid fitting 100 can be configured to process the data, and transmit signals via the feedback loop 130 to the low pressure pump 122. These signals can correspond to the desired changes in the pressure of the fluid, a desired change in the temperature, or other parameter(s) change that is/are modified based on the measured and unmeasured properties of the fuel.

Figure 2:
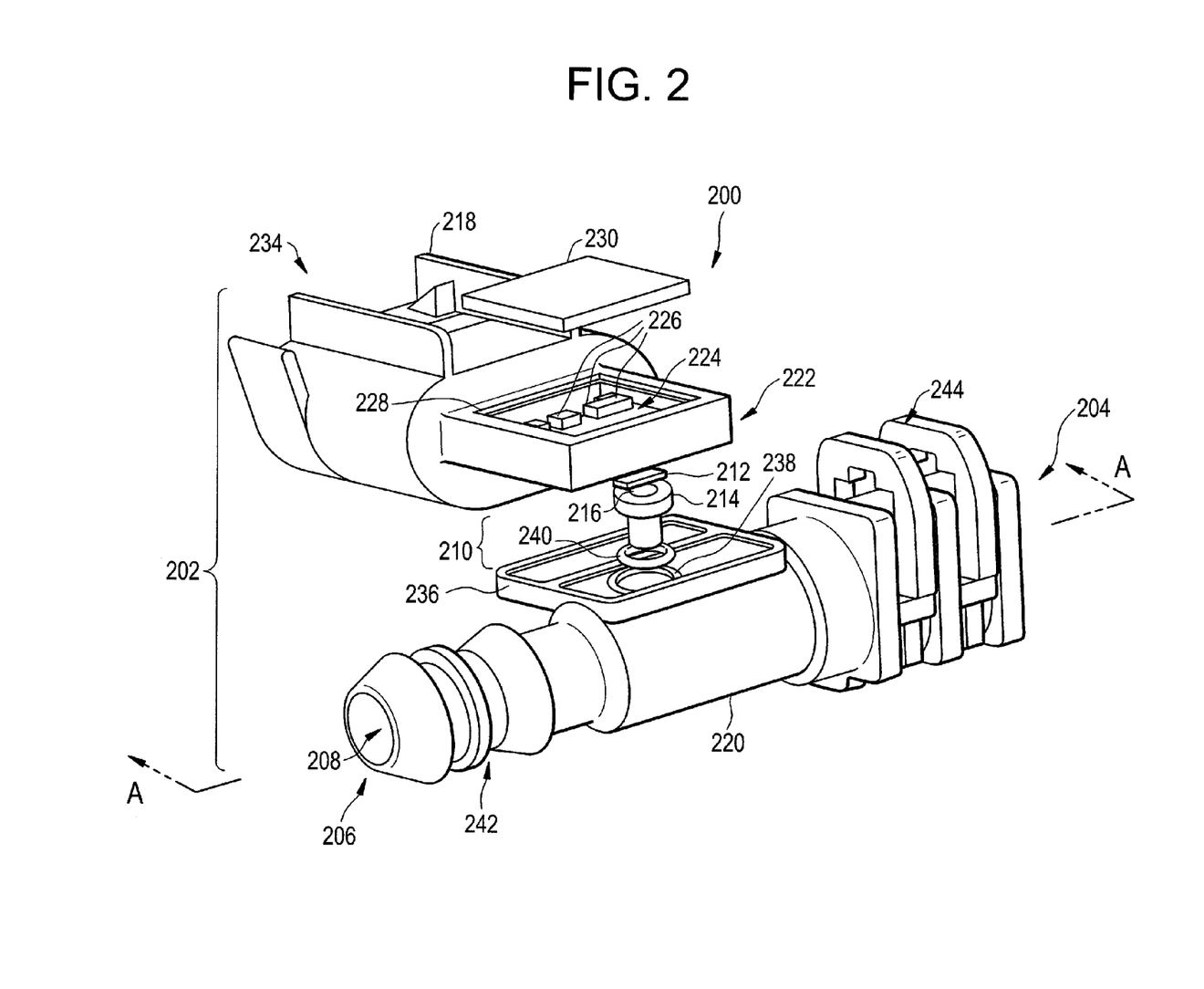
FIG. 2 is a perspective, exploded assembly view of a fluid fitting that is made in another embodiment of the invention.
Figure 3:
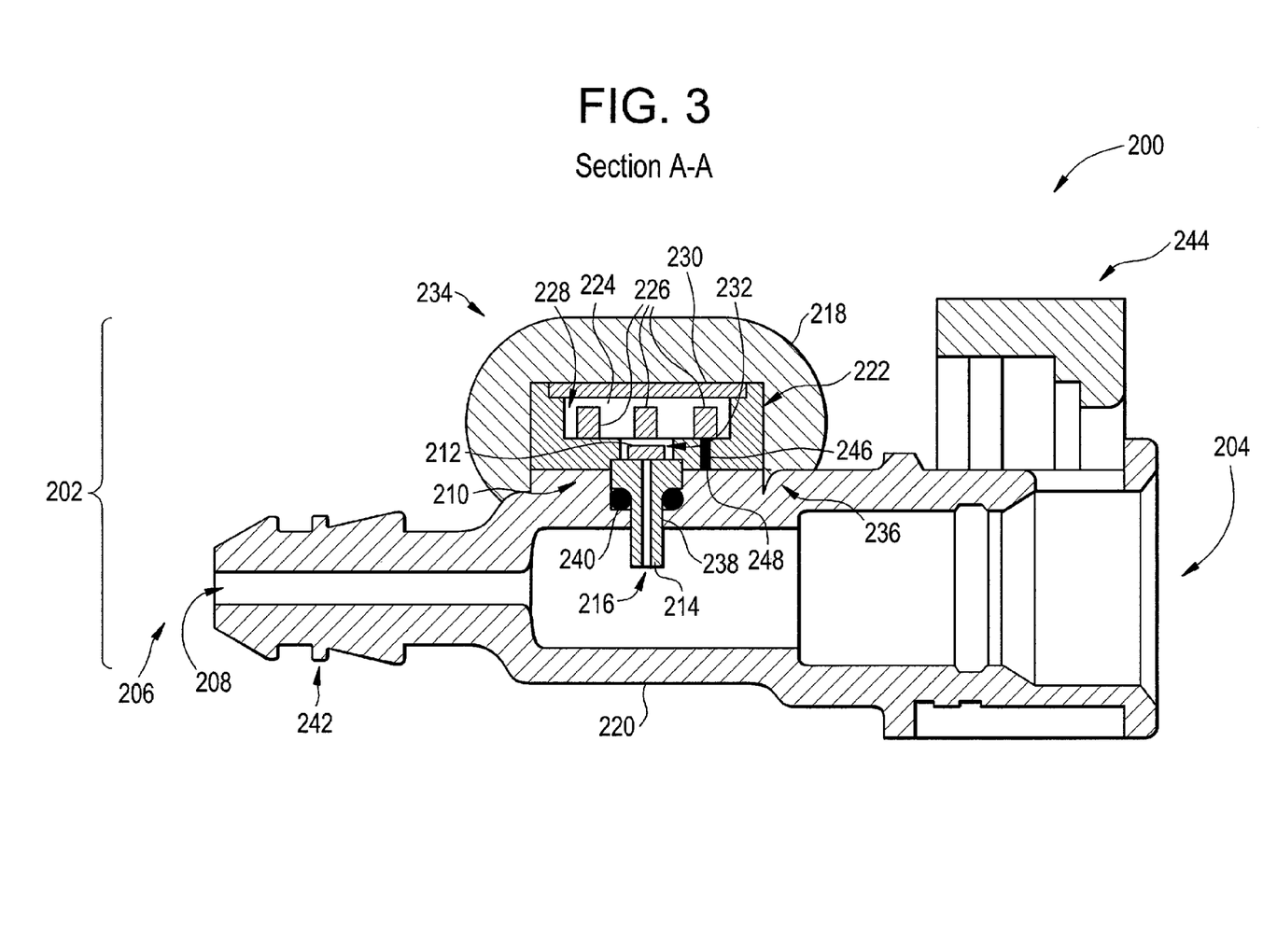
FIG. 3 is a side, cross section, assembly view of the embodiment of the fluid fitting of FIG. 2.

Referring now to FIGS. 2 and 3, there is seen an assembly view of another embodiment of a fluid fitting 200. The fluid fitting 200 can comprise a body 202, an input side 204, an output side 206, and a primary fluid pathway 208 that extends between the input side 204 and the output side 206. The fluid fitting 200 can also comprise a sensing device 210, and in one construction the sensing device 210 can comprise a sensing element 212, and a sensing element housing 214 with a secondary fluid pathway 216 that permits the sensing element 212 to communicate with the fluid in the primary fluid pathway 208.

As it is illustrated in the example of FIG. 2, and mentioned briefly above, the body 202 can comprise a non-conductive housing 218, and a conductive housing 220 that forms the primary fluid pathway 208 therein. The non-conductive housing 218 can comprise a sensor end 222 that has a cavity 224 for housing one or more conductive terminals 226, as well as components such as processors (e.g., ASICs), electrical circuits, and other processing devices that can facilitate the manipulation of the data collected from the fluid. The cavity 224 can comprise an upper cavity opening 228 for receiving a cover 230, and a lower cavity opening 232 exposing the cavity 224 to the primary fluid pathway 208, as described in more detail below. The non-conductive housing 218 can also comprise a receptacle end 234 coupled to the conductive terminals 226 so as to permit the data and information collected by the sensing device 210 to be transmitted out of the fluid fitting 100 such as by an electrical wire (e.g., coaxial cable), plug (e.g., three-prong plug), connector (e.g., coaxial connector), or other device that is operatively configured to transmit data.

Figure 4:
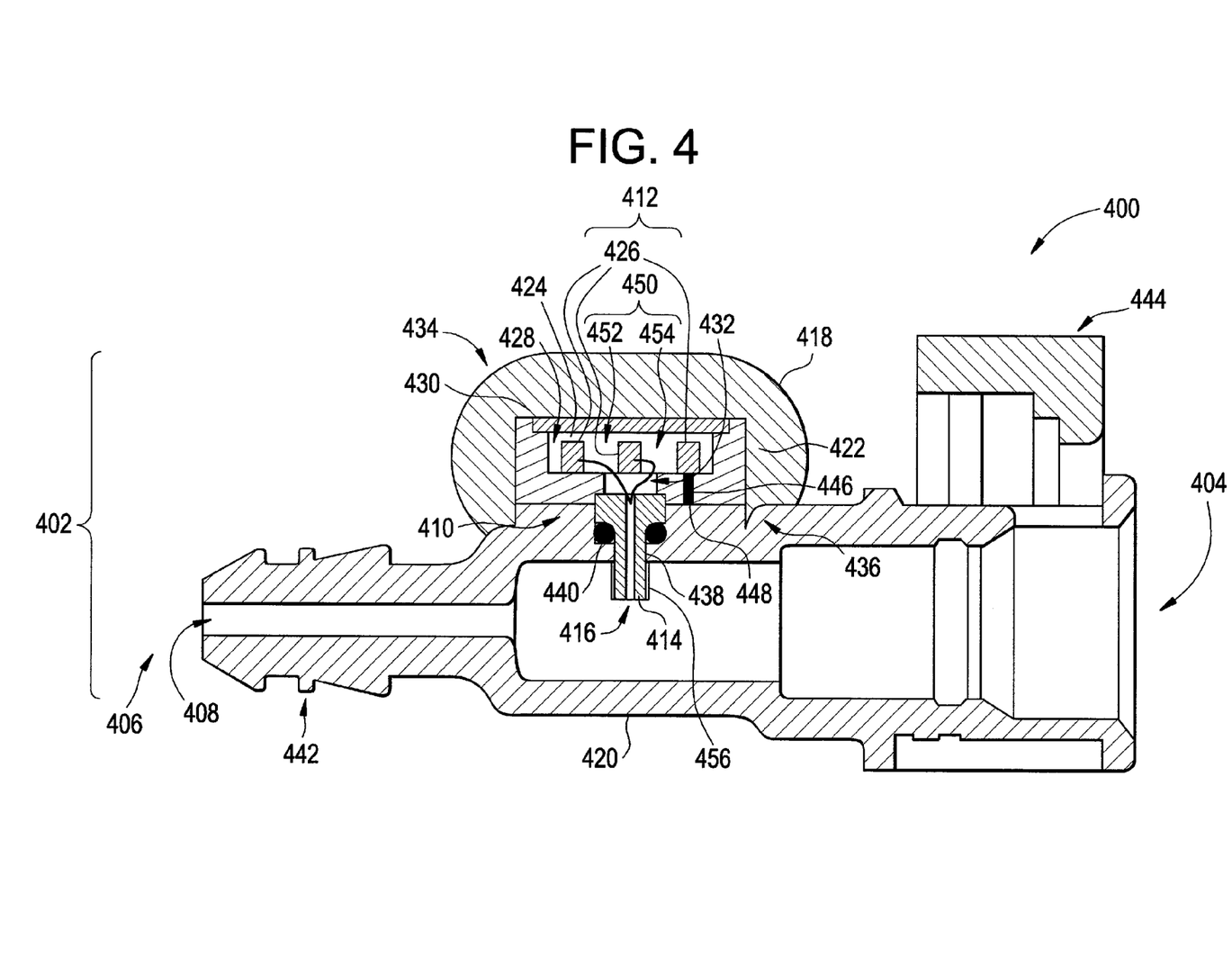
FIG. 4 is a side, cross-section, assembly view of a fluid fitting that is made in accordance with yet another embodiment of the invention.
Figure 5:
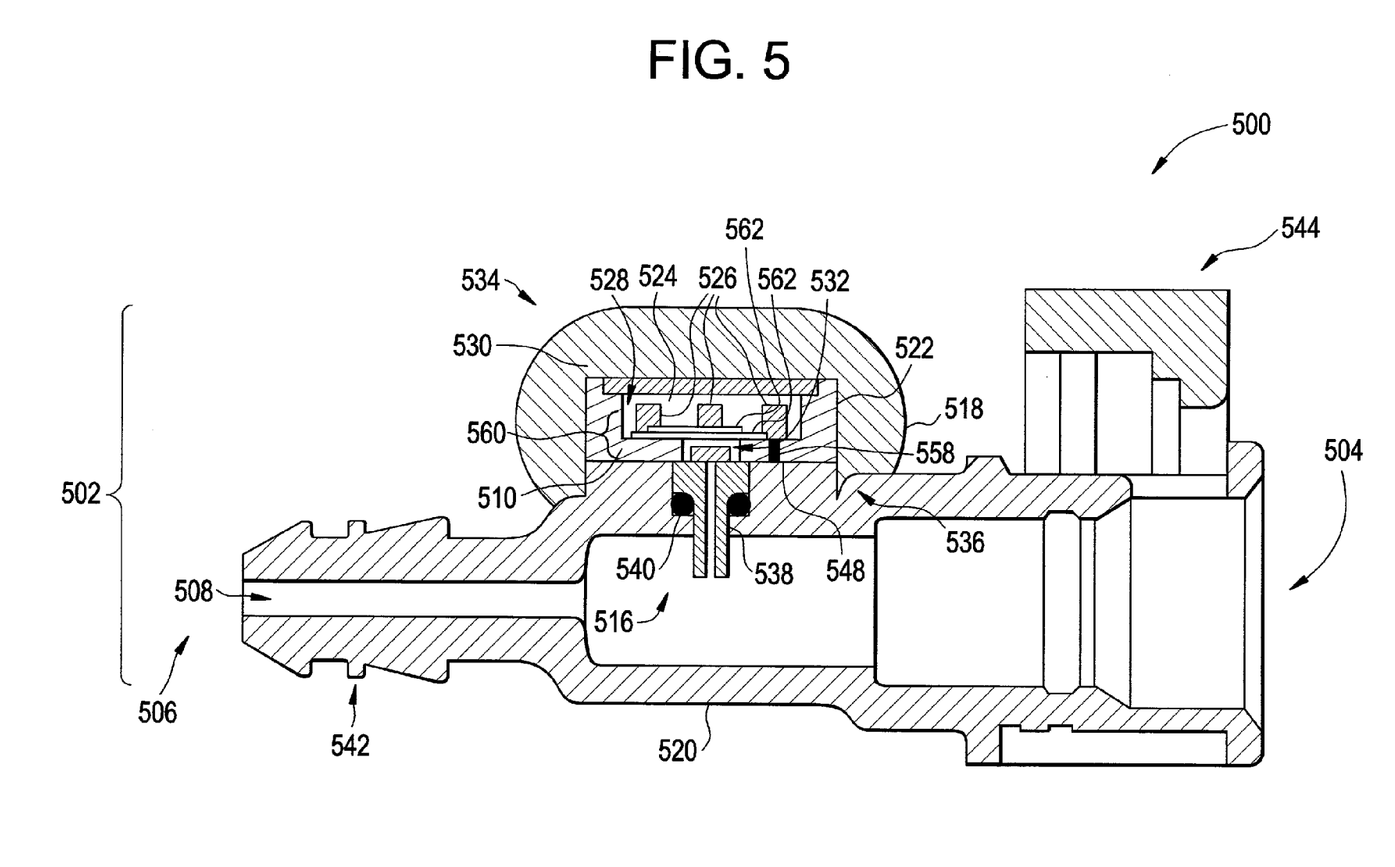
FIG. 5 is a side, cross-section, assembly view of a fluid fitting that is made in accordance with still yet another embodiment of the invention.

The conductive housing 220 can comprise a mating portion 236 with an aperture 238 exposing the primary fluid pathway 208 to the environment (a more detailed example of which can be had with reference to the example of the fluid fittings 400, 500 of FIGS. 4-5). The aperture 238 can be sized, shaped, and configured to receive the sensing element housing 214 so that the fit between the sensing element housing 214 and the conductive housing 220 is hermetically sealed, and in one embodiment the fit is resistant to the pressure of the fluid in the primary fluid pathway 208.

Embodiments of the fitting 200 can also comprise a seal 240 that can be used to enhance the fit, such as can be found by utilizing an o-ring or similar sealing device in surrounding relation to the sensing element housing 214. The seal 240 can be constructed of elastomeric, metallic, or composite materials. The exact materials for use as the seal 240 can be selected based on the properties and characteristics of the fluid, e.g., the temperature and the pressure. Likewise the construction of the seal 240, the aperture 238, the conductive housing 220, and the sensing element housing 214 can all be selected separately, and/or in conjunction with one or more of the other components of the fitting 200, so as to optimize the performance of the fit between the sensing element housing 214 and the conductive housing 220. In one example, the aperture 238 can comprise a feature (not shown) such as a gland, rib, shelf, or other physical formation that can receive at least a portion of the seal 240, and/or the sensing element housing 214. In another example, the feature can be found on both the aperture 238, and the sensing element housing 214.

In one embodiment of the fitting 200, the conductive housing 220 can comprise a barbed connection device 242, and a quick-connection device 244, which in the present example can be disposed on the input side 204 of the body 202. The barbed connection device 242 can comprise barbs, grooves, and/or other features that can be integrated into the conductive housing 220, or disposed as part of the conductive housing 220. These barbs are configured to secure a hose (e.g., the low pressure output line 128 of FIG. 1) to the conductive housing 220 so as to permit flow of the fluid from the primary fluid pathway 208 and into the hose. Additional seals such as o-rings can be disposed annularly around the outer circumference of the barbed connection device 242 such as around one or more of the barbs. These o-rings can be used to further secure, and to seal the hose and the barbed connection device 242.

The quick-connection device 244 can be configured to mechanically secure the hose (e.g., the low pressure input line 120 of FIG. 1) to the conductive housing 220 by providing, in one example, releasably moveable components that can engage a portion of the hose. These components can deform the hose such as by compressing, or squeezing so as to seal the hose and the conductive housing 220 together. It may be desirable, for instance, that the hose is deformed in a manner that prevents the hose from being extracted from the conductive housing 220. An example of one suitable device for use as the quick-connection device 244 can be the GenII Posi-Lock QC, developed and sold by Cooper Standard Automotive of Auburn Hills, Mich.

The sensor end 222 of the non-conductive housing 218 can be configured to mate with the mating portion 236 of the conductive housing 220. This feature can align the lower cavity opening 232 with the aperture 238, and in one particular construction the fitting 200 is assembled so as to align the lower cavity opening 232, the secondary fluid pathway 216 of the sensing element housing 214, and the aperture 238. This alignment can couple the cavity 224 to the primary fluid pathway 208. Each of the sensor end 222 and the mating portion 236 can have, for example, surfaces that are particularly constructed to be mated to one another to substantially contiguously construct the body 202. In one embodiment, a weldment can be used to secure the sensor end 222 and the mating portion 236 in a manner that hermetically seals the body 202. That is, the two elements can be secured in such a way so as to hermetically seal the cavity 224, the secondary fluid pathway 216, and the primary fluid pathway 208. In addition to the examples discussed above, the weldment can be constructed using ultrasonic welding, laser welding, and other welding processes that are suitable for use with plastics and polymers contemplated herein.

As illustrated in the cross-section view of FIG. 3, at least one of the conductive terminals 226 can have a terminal body 246 with an end 248 in contact with the conductive housing 220 when assembled to the non-conductive housing 218. The terminal body 246 can extend through the non-conductive housing 218. The terminal body 246 can likewise be coupled to a ground, or other dissipative connection so as to discharge electrons from the conductive housing 220. In one example, the terminal body 246 is connected to a corresponding terminal of a plug device (not shown) that is received by the receptacle end 234. This plug device can provide power to the fluid fitting 200, exchange data with the fluid fitting 200, and ground the fluid fitting 200, all of which can be facilitated by one or more of the conductive terminals 226.

Another embodiment of a fluid fitting 400 is illustrated in FIG. 4 and described immediately below. Like numerals are used to identify like components as between the examples of FIGS. 2, and 3, but the numerals in FIG. 4 are increase by 200 (e.g., 200 is now 400). It is seen, for instance, that the fluid fitting 400 can comprise a body 402, with an input side 404, an output side 406, a primary fluid pathway 408, and a sensing device 410. Additional components of the fluid fitting 400 will not be positively recited, but rather reference to specific components will be provided as needed for the explanation and description of the features and concepts embodied in the fluid fitting 400 of FIG. 4.

That is, and with focus particularly on the sensing device 410 of the present example, it is seen that the sensing element 412 can comprise sensing wires 450 that extend from the cavity 424 into the secondary fluid pathway 416, via the lower cavity opening 432. Although not shown in the illustration of FIG. 4, it is contemplated that embodiments of the fluid fitting 400 can have sensing wires 450 of varying lengths such as, for example, lengths that extend into primary fluid pathway 408, lengths that extend the length of the secondary fluid pathway 416, and lengths that extend to various portions of the secondary fluid pathway 416. In one embodiment, the sensing wires 450 can comprise a first sensing wire 452, and a second sensing wire 454, both of which can be coupled to one or more of the conductive terminals 426 located in the cavity 424. A shroud 456 can also be incorporated onto, or as part of the sensing element housing 414. The shroud 456, which can prevent fluid from entering the secondary fluid pathway 416, can be coupled to the sensing wires 450. In one example, the sensing wires 450 are constructed of material selected so that the first sensing wire 452, and the second sensing wire 454 can collect temperature data from the fluid in the fluid pathway 408. Such operation of the wires 450 may be consistent with a thermocouple, and or a thermistor as these devices are discussed and contemplated herein.

Discussing one implementation of the fluid fitting 400, hoses can be connected to the input side 404, and the output side 406 so as to permit fluid (e.g., fuel) to flow through the fluid pathway 408, and in one particular example from the input side 404, to the output side 406. As the fluid flows in the fluid pathway 408, some volume of the fluid can enter the secondary fluid pathway 416 of the sensing element housing 414 so as to contact the sensing element 412. This contact will cause a response in the sensing element 412, such as a signal, data, information, or other indicator responsive of the particular property that is being monitored by the sensing device 410. The response is transmitted, via the conductive terminals 426, to a corresponding plug device (not shown) that can be couple to the receptacle end 434. The plug device can be coupled to devices, components, and/or processors remote from the fluid fitting 400.

Yet another embodiment of a fluid fitting 500 is illustrated in FIG. 5, wherein like numerals are used to indicate like components as between the FIGS. 4 and 5, except the numerals are increased by 100 (e.g., 400 is now 500). Here, it is also seen that the fluid fitting 500 can comprise a body 502, with an input side 504, an output side 506, a primary fluid pathway 508, and a sensing device 510. It is seen in the present example of FIG. 5 that the sensing element 512 can comprise a discrete sensing device 558 that is disposed on the sensing element housing 514. The fluid fitting 500 can also comprise a processing device assembly 560 that can have a leadframe 562 disposed in the cavity 524, which is electrically coupled to one or more of the conductive terminals 526, and a processor 564 such as an ASIC that is coupled to the leadframe 562 and to the discrete sensing device 558.

Examples of the discrete sensing device 558 can include, but are not limited to, semiconductor-chip based devices, system-on-a-chip based devices, microelectromechanical system ("MEMS") based devices, among many others. In one example, the discrete sensing device 558 can comprise a piezo-resistive semiconductor die that is responsive to pressure of the fluid. In another example, the discrete sensing device 558 can comprise a Backside Absolute Pressure ("BAPS") sensor die that can be provided by General Electric of Fremont, Calif.

In one embodiment of the fluid fitting 500, the sensing device 510 can be assembled so that discrete sensing device 558 is secured to one of the surfaces of the sensing element housing 514. This assembly can position the discrete sensing device 558 proximate the secondary fluid pathway 516. This position can facilitate communication between the fluid in the pathway 508 and the responsive portion of the discrete sensing device 558. This responsive portion can be sensitive to the property, e.g., pressure, of the fluid in the pathway 508.

In view of the foregoing, it is further contemplated that embodiments of the fluid fittings that are disclosed and contemplated herein can comprise alone, or in combination, the features and concepts described above. For example, and with reference to the embodiments 400, 500 of FIGS. 4 and 5, there can be further combinations of these concepts that can combine the processing devices (e.g., the ASIC), and the sensor devices (e.g., the thermistor, the thermocouple, the pressure sensor), so as to instantiate the scope and spirit of the embodiments of the invention. In one embodiment, a fluid fitting can comprise a thermistor that is coupled to an ASIC. In another embodiment, the fluid fitting can comprise a thermocouple that is coupled to an ASIC. In yet another embodiment, the fluid fitting can comprise a combination of the sensing devices, such as the thermistor and the pressure sensor.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for connecting a plurality of tubes comprising:
a non-conductive housing comprising a receptacle end for receiving a plug device;
a ground path for conducting charge to the receptacle end;
a conductive housing coupled to the ground path, the conductive housing comprising a first fluid pathway for receiving a fluid, and a mating portion secured to the non-conductive housing, the mating portion having an aperture exposing the first fluid pathway to the non-conductive housing;
a sensing element housing disposed in the aperture, the sensing element housing comprising a first open end proximate the non-conductive housing, a second open end proximate the first fluid pathway, and a second fluid pathway extending from the first open end and the second open end, the second fluid pathway for receiving the fluid from the first fluid pathway; and
a sensing element exposed to the fluid in the second fluid pathway, the sensing element for collecting data about a property of the fluid.

2. A device according to claim 1, further comprising a seal in communication with the sensing element housing and the conductive housing, wherein the seal is operatively configured to maintain a pressure of the fluid in the first fluid pathway.

3. A device according to claim 2, wherein the seal comprises an annular ring in surrounding relation to the sensing element housing, and wherein the annular ring comprises an outer surface disposed in sealing communication with the aperture of the conductive housing.

4. A device according to claim 1, wherein the ground path comprises a conductive terminal extending through the non-conductive housing.

5. A device according to claim 1, wherein the sensing element comprises a wire with an end responsive to a property of the fluid.

6. A device according to claim 1, further comprising at least one processor element that is disposed in a cavity of the non-conductive housing, wherein the processor element is coupled to the sensing element so as to receive data collected by the sensing element.

7. A device according to claim 6, wherein the sensing element comprises a piezo-resistive semiconductor die coupled to the processor element, and wherein the piezo-resistive semiconductor die is disposed on a surface of the sensing element housing proximate the first open end.

8. A device according to claim 7, wherein the piezo-resistive semiconductor die comprises a pressure sensor.

9. A device according to claim 1, further comprising a quick-connection device disposed on an end of the conductive housing.

10. A device according to claim 1, wherein a weldment secures the mating portion of the conductive housing to the non-conductive housing.

11. A fluid fitting comprising:
a body comprising a non-conductive housing, and a conductive housing coupled to the non-conductive housing, the conductive housing having a first fluid pathway for receiving a fluid;
a conductive terminal extending through the non-conductive housing, the conductive terminal comprising a terminal body with an end in electrical contact with the conductive housing;
a sensing device responsive to a property of the fluid, the sensing device comprising a sensing element housing extending into the conductive housing, the sensing element housing comprising a first open end proximate the non-conductive housing, a second open end proximate the first fluid pathway, and a second fluid pathway extending between the first open end and the second open end, the second fluid pathway receiving the fluid from the first fluid pathway; and
a seal in surrounding relation to the sensing element housing, the seal comprising at least one surface in contact with the conductive housing.

12. A fluid fitting according to claim 11, further comprising a quick-connection device disposed on the conductive housing.

13. A fluid fitting according to claim 11, wherein the sensing device comprises a plurality of wires extending from a cavity in the non-conductive housing into the second fluid pathway.

14. A fluid fitting according to claim 11, wherein the sensing device comprises piezo-resistive semiconductor die disposed on a surface of the sensing element housing, and wherein the piezo-resistive semiconductor die is responsive to pressure of the fluid in the first fluid pathway.

15. A fluid fitting according to claim 14, further comprising a processing device coupled to the pressure sensor, wherein the processing device comprises a processor disposed in a cavity of the non-conductive housing.

16. A fluid fitting for monitoring properties of a fluid, said fluid fitting comprising:
a non-conductive housing for receiving a plug device;
a conductive housing secured to the non-conductive housing, the conductive housing having a first fluid pathway for receiving the fluid, and a mating portion coupled to the non-conductive housing with a weldment, the mating portion comprising an aperture exposing the first fluid pathway;
a sensing element housing extending through the aperture, the sensing element housing comprising a first open end proximate the non-conductive housing, a second open end proximate the first fluid pathway, and a second fluid pathway extending between the first open end and the second open end, the second fluid pathway receiving fluid from the first fluid pathway;
a seal in surrounding relation to the sensing element housing, the seal having a surface in contact with the aperture; and
a sensing element exposed to the second fluid pathway, the sensing element for sensing properties of the fluid in the first fluid pathway,
wherein the non-conductive housing comprises a conductive terminal extending through the non-conductive housing in a manner discharging electrons from the conductive housing to the plug device.

17. A fluid fitting according to claim 16, wherein the properties comprise one or more of temperature, and pressure.

18. A fluid fitting according to claim 17, wherein the sensing element comprises a piezo-resistive semiconductor die that is responsive to the properties of the fluid in the first fluid pathway.

19. A fluid fitting according to claim 16, wherein the seal comprises a material compatible with fluid temperatures of at least about 150° C.

20. A fluid fitting according to claim 16, wherein the conductive housing and the non-conductive housing comprise polymers.

* * * * *